United States Patent [19]
Albert et al.

[11] Patent Number: 5,596,145
[45] Date of Patent: Jan. 21, 1997

[54] MONOLITHIC RESONATOR FOR VIBRATING BEAM FORCE SENSORS

[75] Inventors: William C. Albert, Boonton; Herbert T. Califano, Bloomingdale, both of N.J.

[73] Assignee: AlliedSignal Inc., Morris Township, Morris County, N.J.

[21] Appl. No.: 315,045

[22] Filed: Sep. 29, 1994

[51] Int. Cl.⁶ .................................................. G01P 15/09
[52] U.S. Cl. ................... 73/514.29; 73/DIG. 1; 310/321; 310/323
[58] Field of Search ............................ 73/517 R, 517 AV, 73/DIG. 1, 718, 651, 777, 862.59; 310/321, 323, 329, 312

[56] References Cited

U.S. PATENT DOCUMENTS

| | | | |
|---|---|---|---|
| 4,710,668 | 12/1987 | Fima et al. | 310/321 |
| 4,743,790 | 5/1988 | Albert | 310/321 |
| 4,804,875 | 2/1989 | Albert | 73/517 AV |
| 4,891,984 | 1/1990 | Fujii et al. | 73/517 R |
| 4,980,598 | 12/1990 | Albert | 73/517 AV |
| 5,109,175 | 4/1992 | Albert | 73/517 R |

*Primary Examiner*—Hezron E. Williams
*Assistant Examiner*—Helen C. Kwok
*Attorney, Agent, or Firm*—Verne E. Kreger, Jr.

[57] ABSTRACT

A monolithic resonator for a vibrating beam device, either an accelerometer or a pressure transducer, includes an outer structure and an inner structure. The outer structure includes a mounting structure, a proof mass or pressure transfer structure and a plurality of flexure beams parallel for the accelerometer and perpendicular for the pressure transducer, extending between the mounting and either proof mass or pressure transfer structure. The inner structure is connected to the outer structure and contains isolator masses, isolator beams and a vibrating beam. The outer structure has a thickness greater than the intermediate thickness of the isolator masses which is in turn thicker than the inner structure thickness of the isolator beams and vibrating beam. The intermediate thickness is independently selected to achieve the ideal mass requirements of the vibration isolation mechanism.

16 Claims, 5 Drawing Sheets

MONOLITHIC RESONATOR FOR VIBRATING BEAM FORCE SENSORS

BACKGROUND OF THE INVENTION

1. Field of the Invention

The present invention relates to monolithic vibrating beam force sensors (resonators) and more particularly to their use in vibrating beam pressure transducers and vibrating beam accelerometers in which the proof mass, the proof mass suspension system and the resonator are made from a single piece of quartz crystal.

2. Description of the Prior Art

U.S. Pat. No. 5,109,175 titled Monolithic Resonator for Vibrating Beam Force Sensors describes a three dimensional monolithic resonator structure where the basic sensing element is a vibrating beam that changes its frequency of vibration in response to axial force. The two primary applications described for the prior art invention are for accelerometers and pressure transducers. For the accelerometer application, the source of axial force is a proof mass reacting to an input acceleration being measured. For the pressure transducer application, the force on the resonator is caused by a bellows which responds to an applied pressure being measured. The primary innovative feature of the prior art structure is that the sensing portion of the structure, consisting of the vibrating beam and its vibration isolation mechanism, has a much thinner cross-section than the outer structure. Thus, the monolithic structure has two thicknesses which permit the inner portion of the structure to be as thin as necessary for sensitivity requirements, while the outer portion of the structure can be as thick as necessary to have the required mass or stiffness necessary for its application.

SUMMARY OF THE INVENTION

The present invention includes a monolithic resonator for a vibrating beam device which can be used in either an accelerometer or a pressure transducer. The device includes an outer structure and an inner structure. The outer structure includes a mounting structure, a proof mass or pressure transmitting structure and a plurality of flexure beams that are parallel for the accelerometer and perpendicular for the pressure transducer, extending between the mounting and either proof mass or pressure transmitting structures. The inner structure includes a vibrating beam and a pair of vibration isolation mechanisms each comprising an isolator mass and an isolator beam. The vibrating beam is connected by means of the vibration mechanisms to the proof mass or pressure transmitting structure at one end and the mount structure at its other end. The outer structure has a thickness greater than the inner structure. The inner structure has two thicknesses whereby the isolator mass portion has an intermediate structure thickness that is thicker than the inner structure thickness of the vibrating beam and isolator beams. All three thicknesses can be independently selected so that the sensitivity requirements of the vibrating beam, the mass and stiffness requirements of the outer structure and the ideal mass requirements of the vibration isolation mechanisms can all be achieved.

DETAILED DESCRIPTION OF THE INVENTION

Figure 1A:
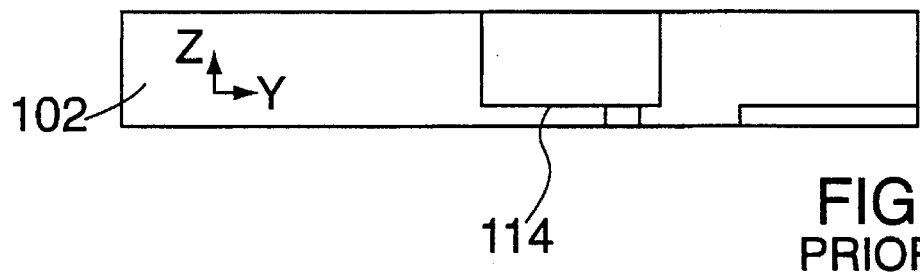
FIGS. 1a and 1b illustrate side and front elevational views of a monolithic resonator for a vibrating beam accelerometer of the prior art.
Figure 1B:
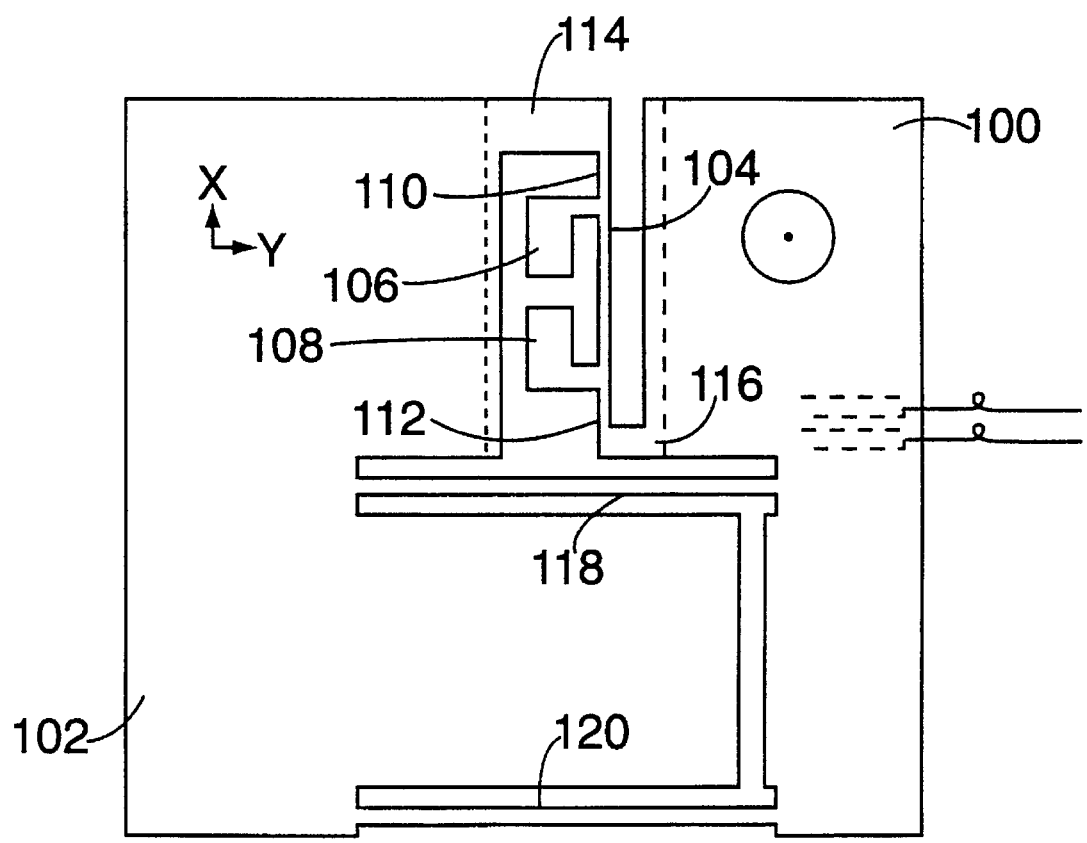

FIGS. 1a–1b (FIGS. 6 and 7 of the referenced prior art patent) describes a prior art accelerometer application structure. Conversely, FIGS. 2a–2b (FIG. 8 of the prior art patent) describes a prior art pressure transducer application structure.

The sensing portion of the structure consists of the vibrating beam. This beam vibrates in the x-y plane at its fundamental frequency as a fixed-fixed vibrating beam that is shown in the figure. Because the beam is long and thin, it has "string-like" properties whereby an axial tension force will increase the resonant frequency and compression will decrease the resonant frequency. Therefore, the vibrating beam exhibits a frequency modulation in response to axial forces. The vibrations of the beam are sustained by the combined interaction of an electrode pattern plated on the beam, the piezoelectric properties of the quartz crystal material, and the electrical energy supplied by the electronic oscillator circuit. Note that the plated electrode pattern on the beam along with the plated conductive paths leading to the electrode termination are omitted from FIG. 1 since these electrode patterns can be any one of several piezoelectric drive patterns that are well known in the crystal oscillator art.

The vibration isolation mechanism consists of the isolator masses and isolator beams. The function of this isolator mechanism is to prevent vibration energy from escaping from the vibrating beam. How this is accomplished is described graphically and analytically in FIGS. 3 and 4.

The outer structure consists of the proof mass portion 102, the flexure beams 118 and 120 and the mount structure 100. As shown in FIGS. 1a–1b, one end of the sensing element is attached to the mount structure 100 through surface 116 while the other end is attached to the proof mass structure 102 through surface 114. These two structures 100 and 102 are also joined together by means of the flexure beams 118 and 120. Without the vibrating beam sensing element 104 in place, the flexure beams 118 and 120 will permit the mount structure 100 and proof mass structure 102 to move one with respect to the other in a parallel-like motion along the x sensing axis. Therefore, when the entire structure senses acceleration along the x axis, the proof mass 102 places the vibrating beam 104 in tension or compression, depending on the direction of the acceleration, and causes the resonant frequency of the vibrating beam 104 to change as a function of input acceleration.

The innovative feature of the prior art just described is as follows. It can be shown that the frequency-force sensitivity of the vibrating beam is inversely proportional to the thickness of the beam in the z axis direction. Therefore, a high sensitivity vibrating beam 104 is characterized by a thin beam in the z direction. Conversely, a high acceleration-force sensitivity is achieved by a heavy proof mass 102 which is achieved by a relatively thick outer structure along the z axis. The proof mass support structure, consisting of the flexure beams 118 and 120, must withstand acceleration and shock loads along the y and z axes. To achieve this, it is also desirable to have a high z axis thickness. Therefore, to independently achieve the desired vibrating beam 104 sensitivity requirements and the outer structure mass and stiffness requirements, it is a great advantage to have a two-thickness structure. This is the primary innovation of the prior art patent.

Figure 2C:
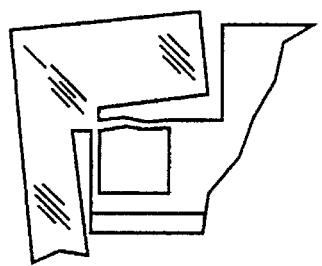
FIGS. 2a, 2b and 2c illustrate side, front elevational and partial front elevational views, respectively, of a monolithic resonator for a vibrating beam pressure transducer of the prior art.
Figure 2B:
Figure 2A:
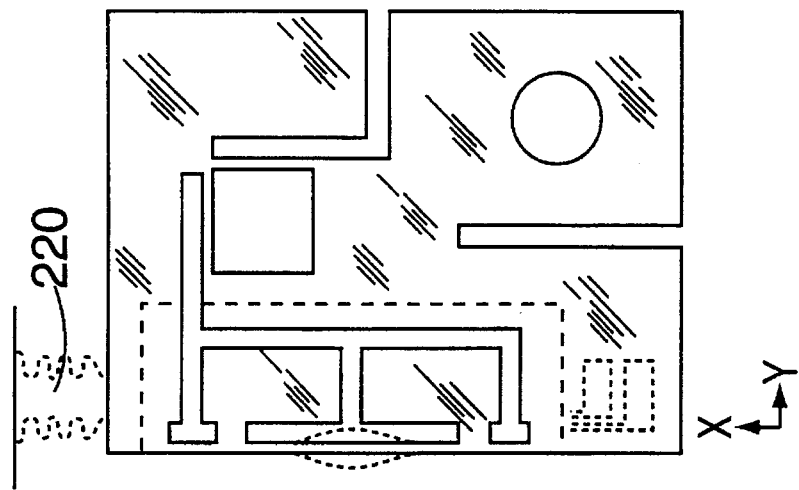
Figure 2A:
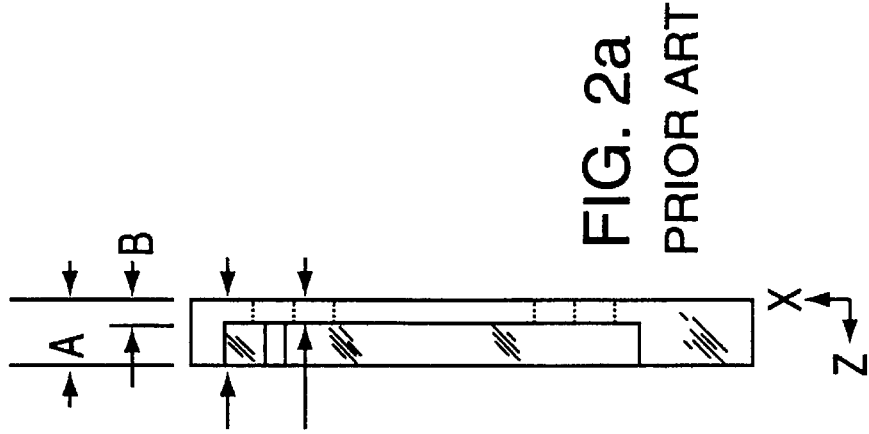

The same reasoning applies to the pressure transducer application of FIGS. 2a–2b, with the exception that the overall structure is designed to be relatively acceleration insensitive, and the force to the vibrating beam is achieved by pressure to the bellows 220 as shown. However, the high frequency-force sensitivity of a thin inner structure combined with the high shock resistance of a thick outer structure still applies.

The disadvantage of the prior art lies with the inner structure comprising the vibrating beam 104 and the combination isolator mass 106 and 108—isolator beam 110 and 112 isolation mechanism. The z axis thickness of all these components is dictated by the sensitivity requirements of the vibrating beam 104. While ideal for the vibrating beam 104, the z axis thickness selected may not be ideal for the vibration isolation mechanism.

The isolator masses 106 and 108, along with the isolator beams 110 and 112, make up the vibration isolation system that prevents vibration energy from escaping from the vibrating beam. A loss of energy results in low Q and a degradation in instrument performance. Operation of the vibration isolation mechanism is described below.

Figure 3:
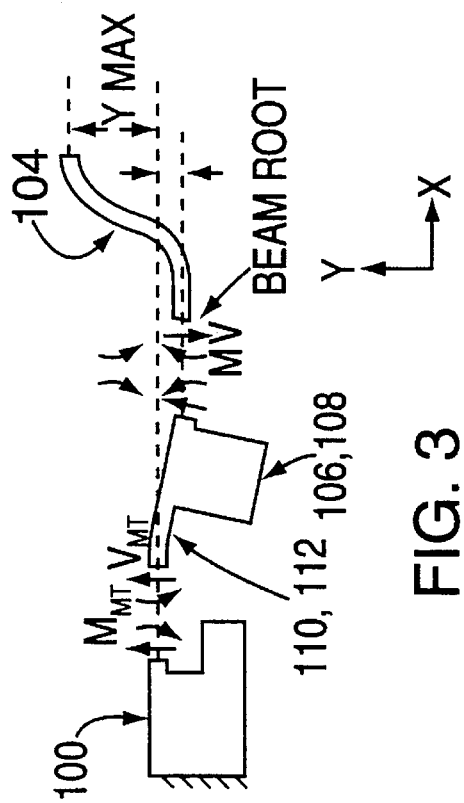
FIG. 3 illustrates the vibration isolation system

As illustrated in FIG. 3, the vibrating beam 104 vibrates as a virtual fixed-fixed beam since there is some linear and angular displacement at the beam root (there would be none for a true fixed-fixed beam). By design, these displacements are kept small where $y_R$ is typically 1% of $y_{MAX}$. Due to beam flexing, there are moment (M) and shear (V) reactions at the beam root, as shown in FIG. 3. If these V and M reactions were imparted directly to the mount, much vibration energy would escape, and the Q of the vibrating beam would be low and vibration may not be possible. The vibration isolation mechanism greatly reduces the mount moment ($M_{MT}$) and shear ($V_{MT}$) reactions by reducing the transmissibility (T). T is reduced by classical vibration isolation as follows.

Figure 4:
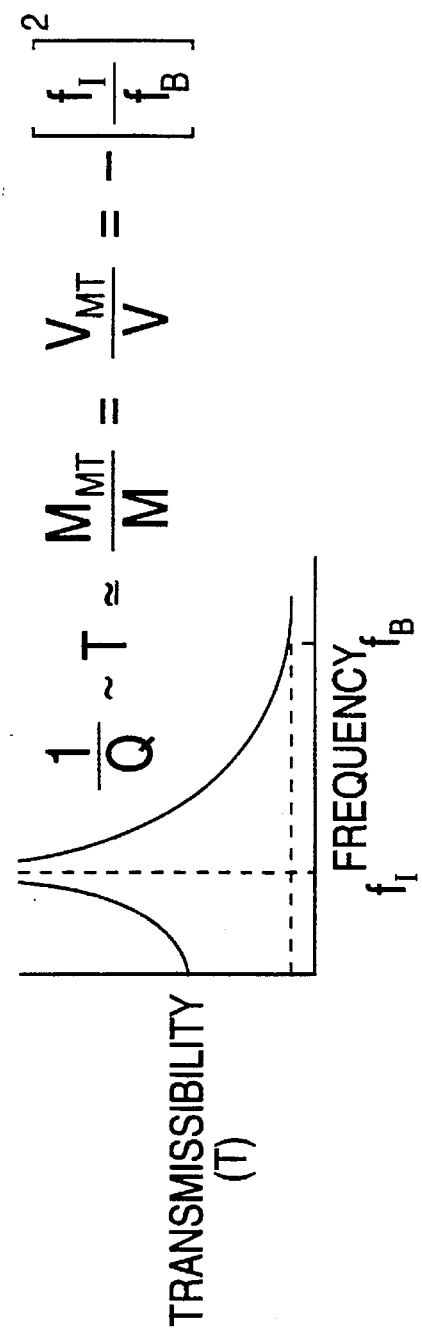
FIG. 4 illustrates Transmissibility vs. Frequency.

The M and V reactions occur at the beam vibration frequency ($f_B$) of typically 50 kHz. The isolator mass and isolator beam are designed to have a natural frequency ($f_I$) very much lower than the vibrating beam frequency. The result is conventional vibration isolation, whereby the moment and shear reactions reaching the resonator mount are attenuated by the approximate ratio of $(f_I/f_B)^2$. This isolation system maintains high vibration Q (by achieving a low T), as illustrated graphically and analytically in FIG. 4. Note that $f_I=\sqrt{(k/M)}$ where k and m are the stiffness and mass respectively of the isolator mechanism to y axis displacement, as shown in FIG. 4. Therefore, if m can be increased, $f_I$ will decrease and, therefore, decrease T and increase Q. While the mass (m) may be increased by increasing its x or y dimensions, there are physical and performance constraints preventing this. Increasing m while not changing the x and y dimensions of the isolator mass is the basis of the present invention and is discussed below.

Figure 5A:
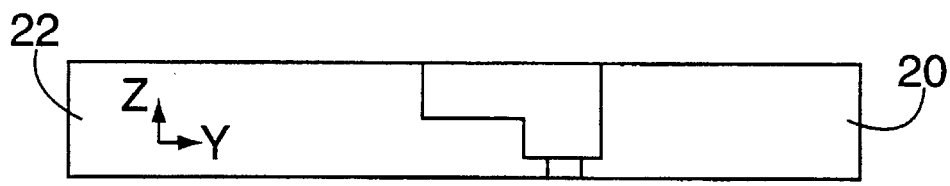
FIGS. 5a and 5b illustrate a side and front elevational view of a monolithic resonator for a vibrating beam accelerometer of the present invention.
Figure 5B:
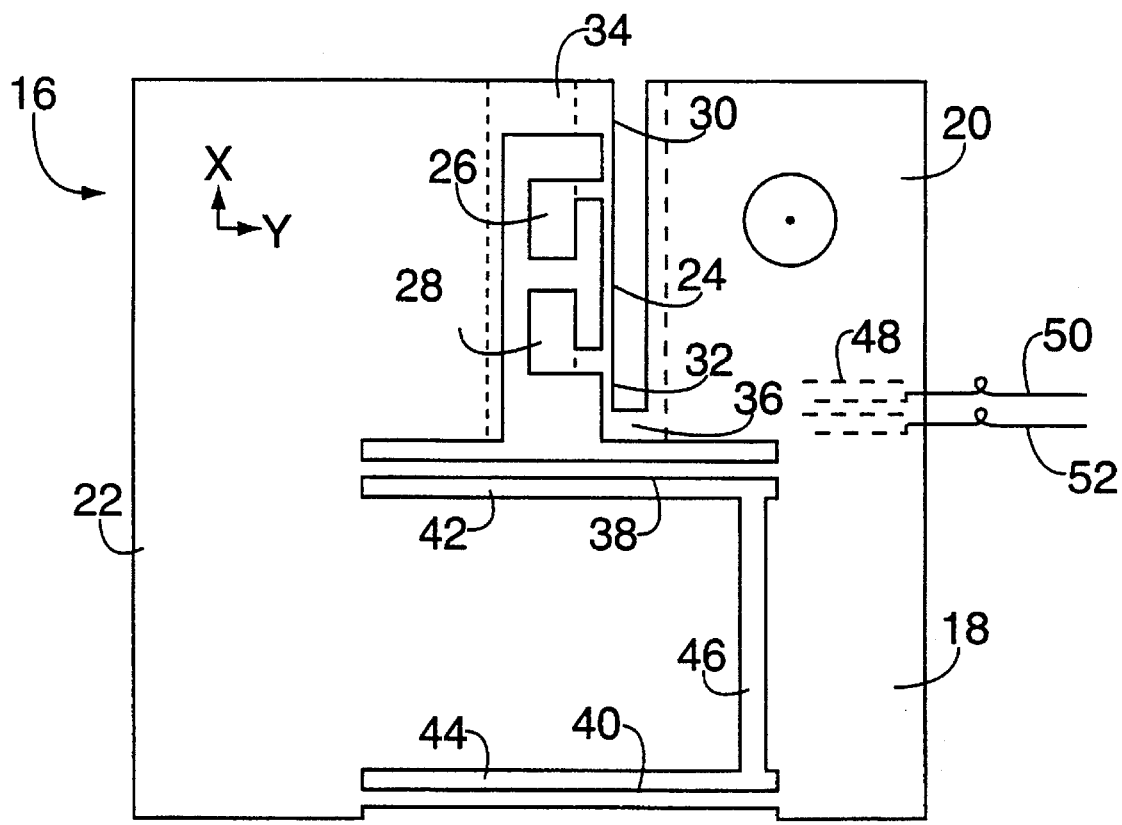

In FIGS. 5a–5b, the resonator 16 includes a mounting structure 18, a mounting structure appendage 20, and a proof mass structure 22. A vibrating beam 24 extends between a pair of isolator masses 26, 28 which, in turn, are connected via isolator beams 30, 32, respectively, to proof mass 22 via connecting member 34 and to mount structure appendage 20 via connecting member 36. Flexure beams 38, 40 extend horizontally between the mounting structure 18 and the proof mass structure 22. Space 42 below the upper flexure beam 38 is connected to space 44 above the lower flexure beam 40 by a vertically extending slot or space 46. A conventional electrode termination shown in phantom at 48 is provided from which leads 50, 52 extend to a conventional oscillator circuit (not shown).

The inner structure including vibrating beam 24, isolator beams 30, 32, isolator masses 26, 28 and members 34, 36 is significantly thinner in the Z-axis direction than the outer structure which includes the mounting structure 18, mounting structure appendage 20, proof mass structure 22 and flexure beams 38, 40. Isolator masses 26, 28 of the inner structure have a thickness greater than the isolator beams 30, 32 and vibrating beam 24.

The preferred embodiment of the present invention, as shown in FIG. 5, includes the intermediate thickness to the isolator masses so that, in addition to the sensitivity requirements of the vibrating beam and the mass and stiffness requirements of the thick outer structure, an intermediate thickness can be independently selected to achieve the ideal mass requirements of the vibration isolation mechanism.

Figure 6B:
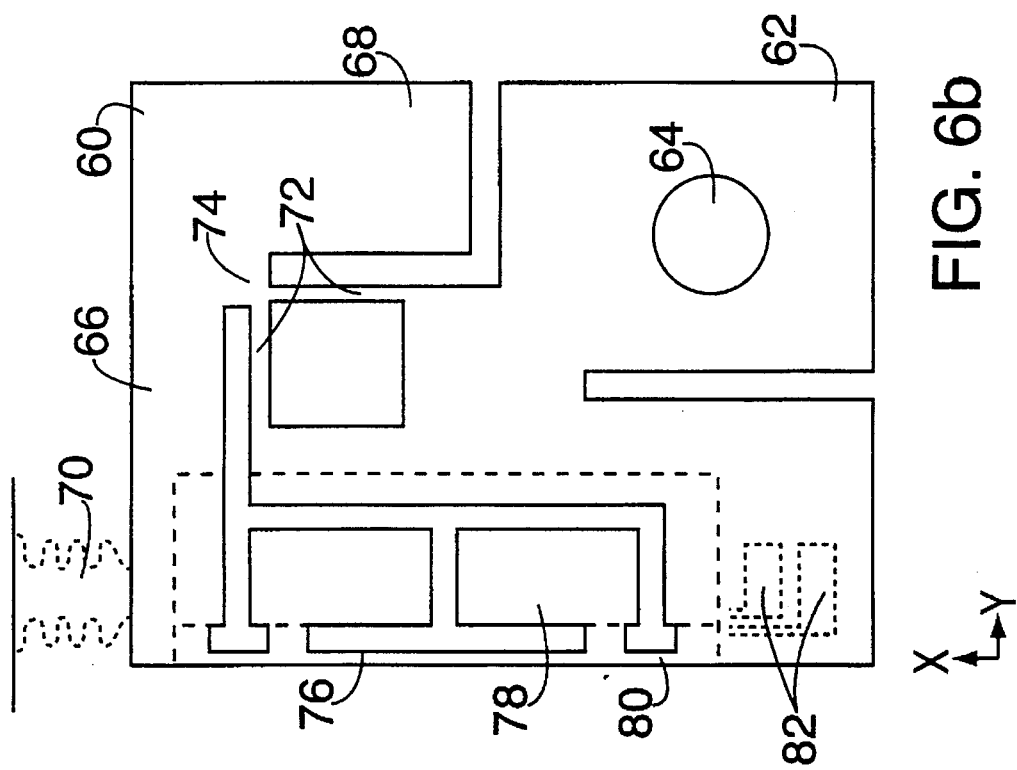
FIGS. 6a and 6b illustrate side and front elevational views of a monolithic resonator for a vibrating beam pressure transducer of the present invention.
Figure 6A:
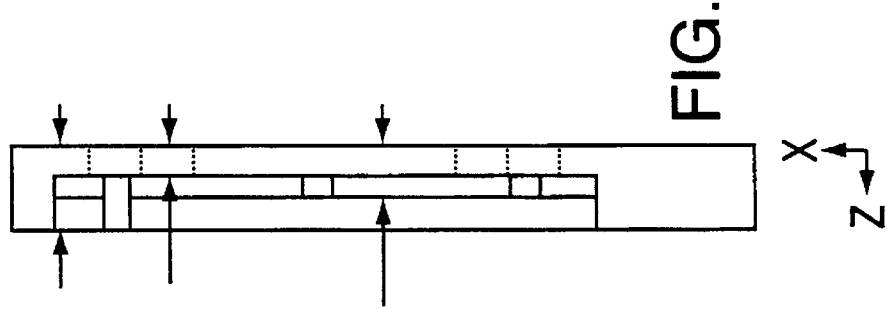

In FIG. 6, the pressure transducer application, the monolithic sensory element 60 includes a mount structure 62 with mount hole 64. The force transfer structure comprises a lever arm structure including lever arm 66 and balance weight 68. In the pressure transducer embodiment, a force transfer structure comprising a means for converting fluid pressure, bellows 70 (shown in dotted line form), provides a force to act upon lever arm 66 by virtue of a fluid (liquid or gas) pressure difference between fluid inside and outside of said bellows.

The force transfer structure is connected to the mount by at least one flexure beam which, in a preferred embodiment, comprises two flexure beams 72. In a further preferred embodiment, the flexure beams are orthogonally connected between the mount structure and the force transfer structure so as to oppose relative movement between the force transfer structure and the mount structure in X and Y directions while permitting pivotal movement between the structures about an axis parallel to the Z axis at the pivot point 74. Relative movement about pivot point 74 of the force transfer structure relative to the mount structure is resisted by the vibrating beam structure which extends between the force transfer structure and the mount structure.

The vibrating beam structure includes vibrating beam 76, isolator mass 78 and isolator beam 80. The operation of the vibrating beam, isolator mass and isolator beams have previously been discussed in prior art references. As previously noted, electrode terminations 82 provide an electronic connection to the oscillator to maintain the beam in vibration.

As in the case of the vibrating beam accelerometer, the thickness (in the Z axis direction) of the inner structure, comprising vibrating beam 76, and isolator beams 80, is less than the thickness of the inner structure comprising the isolator mass 78. The inner structure thickness is less than the thickness of the mount 62, flexure beams 72 and force transfer structure. This embodiment includes an intermediate thickness to the isolator mass so that, in addition to the sensitivity requirements of the vibrating beam and the mass and stiffness requirements of the thick outer structure, an intermediate thickness can be independently selected to achieve the ideal mass requirements of the vibration isolation mechanism. This difference in thickness is illustrated by the rectangular dashed outline surrounding the isolator masses.

Embodiments of the present invention, as illustrated in FIGS. 5 and 6, comprise an intermediate thickness to the structures that results in the isolator mass having a thickness of its own. This allows the mass of the isolator mass to be increased independent of the vibrating beam thickness requirements for sensitivity, and also independent of the outer structure thickness requirements for mass or shock requirements.

It is not intended that this invention be limited to the hardware arrangement or operational procedures shown disclosed. This invention includes all of the alterations and variations thereto as encompassed within the scope of the claims as follows.

What is claimed is:

1. A monolithic resonator for a force sensor, wherein said force sensor includes a vibrating beam, said resonator comprising:

an outer structure including a mounting structure, a force transfer structure, and at least one flexure beam extending between said mounting and force transfer structures; and, an inner structure connected to said outer structure including isolator masses, isolator beams and said vibrating beam extending between said force transfer structure and said mounting structure;

wherein said outer structure has a thickness greater than the thickness of said isolator masses and the thickness of said isolator masses is greater than the thickness of said isolator beams and said vibrating beam.

2. A monolithic resonator according to claim 1 wherein the thickness of said outer structure is about three to about ten times the thickness of said inner structure.

3. A monolithic resonator according to claim 1 wherein said resonator has a height extending in an X direction, a length extending in a Y direction, and a thickness extending in a Z direction, said X, Y and Z directions being substantially mutually perpendicular.

4. A monolithic resonator according to claim 1 and further including a mounting structure appendage for attaching said resonator to an accelerometer housing.

5. A monolithic resonator according to claim 1 and further including a structure appendage for attaching a force input structure to said force transfer structure.

6. A monolithic resonator according to claim 1 wherein said at least one flexure beam is located in proximity to one end of said vibrating beam and extends substantially perpendicular thereto.

7. A monolithic resonator according to claim 1 wherein said vibrating beam extends longitudinally in the X-direction.

8. A monolithic resonator according to claim 3 wherein said force transfer structure comprises a proof mass structure and said proof mass structure extends in the X-direction less than about one half an extent in the X-direction of said mounting structure.

9. A monolithic resonator according to claim 6 wherein said at least one flexure beam comprises two or more flexure beams for load stiffness in the Z-direction and load sensitivity in the X-direction.

10. A monolithic resonator according to claim 3 wherein said mounting structure and said force transfer structure extend substantially equally in the X-direction, and wherein said at least one flexure beam is located in proximity to one end of said vibrating beam.

11. A monolithic resonator according to claim 10 wherein at least one additional flexure beam is provided between said mounting and force transfer structures in proximity to the other end of said beam.

12. A monolithic resonator according to claim 10 wherein alternative electrode terminations are provided on both said mounting structure and said force transfer structure.

13. A monolithic resonator according to claim 1 wherein alternative electrode terminations are provided on both said mounting structure and said force transfer structure.

14. A monolithic resonator according to claim 6 wherein said at least one flexure beam comprises a pair of vertically spaced beams.

15. A monolithic resonator comprising:

a vibrating beam;

isolator masses connected at either end of said vibrating beam;

isolator beams extending from each of said isolator masses;

a mounting structure to one side of said vibrating beam, and a force transfer structure to the other side of said vibrating beam; and, at least one flexure beam extending between said mounting structure and said force transfer structure, below said vibrating beam and substantially perpendicular thereto;

wherein said vibrating beam and said isolator beams have a thickness less than said isolator masses which have a thickness less than said mounting structure and said force transfer structure.

16. A monolithic resonator comprising:

a vibrating beam;

isolator masses connected at either end of said vibrating beam;

isolator beams extending from each of said isolator masses;

a mounting structure to one side of said vibrating beam, and a lever arm structure to the other side of said vibrating beam; and, at least one flexure beam extending between said mounting structure and said lever arm structure, below said lever arm and substantially parallel to said vibrating beam;

wherein said vibrating beam and said isolator beams have a thickness less than said isolator masses which have a thickness less than said mounting structure and said lever arm structure.

* * * * *